(12) United States Patent
Nowell et al.

(10) Patent No.: US 11,346,476 B2
(45) Date of Patent: May 31, 2022

(54) HIGH PRESSURE SWIVEL JOINT

(71) Applicant: Kerr Machine Co., Sulphur, OK (US)

(72) Inventors: Mark S. Nowell, Ardmore, OK (US); Kelcy Jake Foster, Ardmore, OK (US); Christopher Todd Barnett, Stratford, OK (US)

(73) Assignee: Kerr Machine Co., Sulphur, OK (US)

( * ) Notice: Subject to any disclaimer, the term of this patent is extended or adjusted under 35 U.S.C. 154(b) by 428 days.

(21) Appl. No.: 16/129,171

(22) Filed: Sep. 12, 2018

(65) Prior Publication Data

US 2019/0137019 A1    May 9, 2019

Related U.S. Application Data

(63) Continuation-in-part of application No. 15/488,713, filed on Apr. 17, 2017.

(60) Provisional application No. 62/557,907, filed on Sep. 13, 2017, provisional application No. 62/324,153, filed on Apr. 18, 2016.

(51) Int. Cl.
  *F16L 27/08*   (2006.01)
  *E21B 17/05*   (2006.01)
  *F16L 21/02*   (2006.01)

(52) U.S. Cl.
  CPC .......... *F16L 27/0828* (2013.01); *E21B 17/05* (2013.01); *F16L 21/02* (2013.01)

(58) Field of Classification Search
  CPC .............................. F16L 27/0828; E21B 17/05
  USPC ................................................. 285/275, 276
  See application file for complete search history.

(56) References Cited

U.S. PATENT DOCUMENTS

| | | | |
|---|---|---|---|
| 2,382,375 A | 8/1945 | Allen et al. | |
| 2,412,287 A | 12/1946 | Phillips | |
| 2,511,386 A | 6/1950 | Warren | |
| 3,347,570 A * | 10/1967 | Roesssler | 285/276 |
| 3,884,511 A | 5/1975 | Harmanson | |
| 3,967,841 A | 7/1976 | Kendrick et al. | |
| 3,967,842 A | 7/1976 | Kendrick | |
| 4,186,946 A | 2/1980 | Snow | |
| 4,234,216 A | 11/1980 | Swanson et al. | |
| 4,262,003 A | 4/1981 | Urquhart et al. | |
| 4,355,827 A | 10/1982 | Ehret | |
| 4,431,217 A | 2/1984 | Witt | |
| 4,626,003 A | 12/1986 | Williams et al. | |
| 4,693,500 A | 9/1987 | Anderson | |
| 4,695,078 A | 9/1987 | Anderson | |
| 4,804,206 A * | 2/1989 | Wood | F16L 27/0841 285/276 |
| 5,149,148 A | 9/1992 | Taeuber, Jr. et al. | |
| 5,538,296 A | 7/1996 | Horton | |
| 5,735,552 A * | 4/1998 | Elliott-Moore | 285/276 |
| 6,164,707 A | 12/2000 | Ungchusri et al. | |
| 6,461,140 B1 | 10/2002 | Bosg et al. | |
| 6,595,555 B2 | 7/2003 | Ungchusri et al. | |

(Continued)

*Primary Examiner* — Zachary T Dragicevich
(74) *Attorney, Agent, or Firm* — Tomlinson McKinstry, P.C.

(57) ABSTRACT

A high pressure swivel joint used in pipe assemblies transferring high pressure fluid. The swivel joint comprises a first pipe section and a sleeve-like second pipe section. The first pipe section is inserted into the second pipe section and the sections are relatively rotatable. A wear ring is positioned within a recess formed in the inner wall of the first pipe section. A second wear ring is positioned within a recess formed in the inner wall of the second pipe section.

20 Claims, 14 Drawing Sheets

(56) References Cited

U.S. PATENT DOCUMENTS

| | | |
|---|---|---|
| 8,783,733 B2 | 7/2014 | Tausch |
| 10,100,959 B2 | 10/2018 | Ungchusri et al. |
| 2005/0275220 A1 | 12/2005 | Shu |
| 2009/0008934 A1 | 1/2009 | Matzner et al. |
| 2013/0118607 A1 | 5/2013 | Eley et al. |
| 2016/0102794 A1* | 4/2016 | Chung ............... F16L 27/0828 |
| 2020/0109804 A1 | 4/2020 | Nguyen |

* cited by examiner

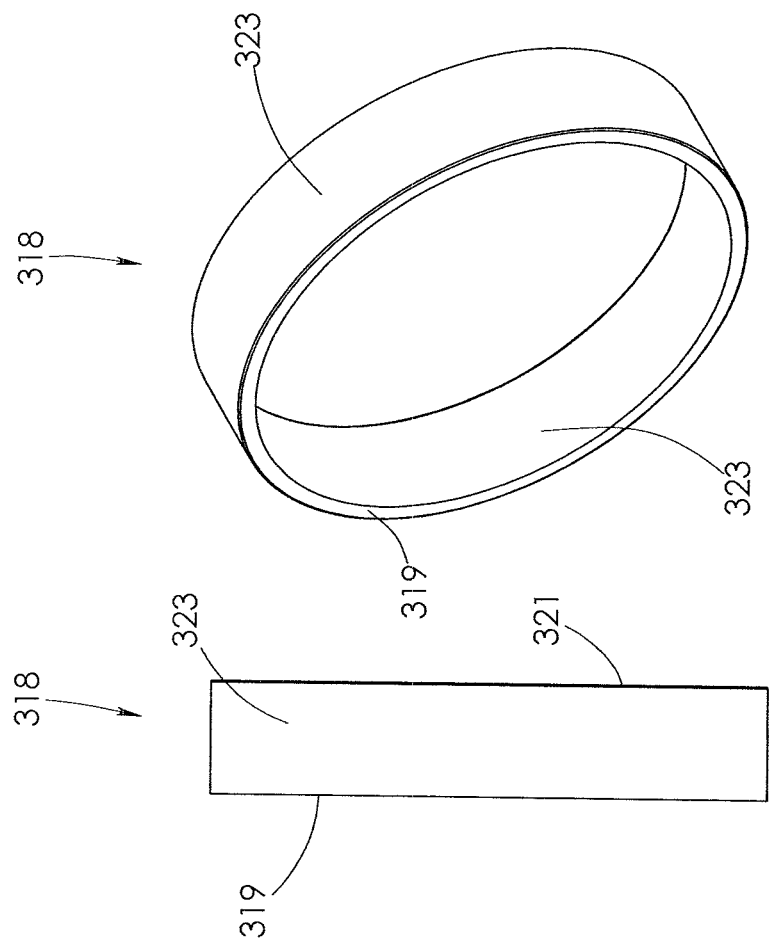
FIG. 16
FIG. 15
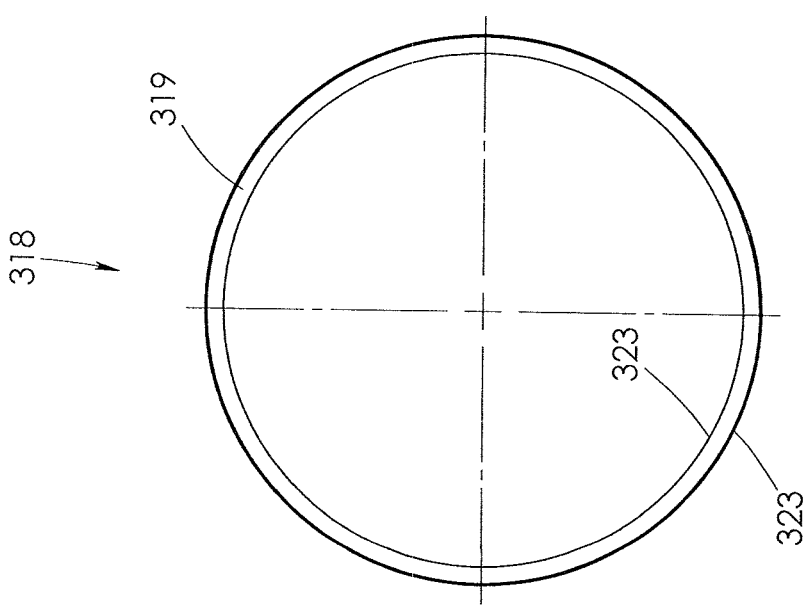
FIG. 14

HIGH PRESSURE SWIVEL JOINT

SUMMARY

The invention is directed to a swivel joint comprising a tubular first member and a tubular second member. The tubular first member has a first longitudinal axis, a connection end, and an external face formed at the connection end of the first member. The tubular second member has a first longitudinal axis, a connection end, and a recessed internal face within the connection end and extending normal to the first longitudinal axis. The connection end of the first member is coaxially received within the connection end of the second member. The first and second members are relatively rotatable. A first wear ring is positioned adjacent an inner wall of the connection end of the first member.

BRIEF DESCRIPTION OF THE DRAWINGS

FIG. 14 is a top plan view of a wear ring for use with the swivel joints shown in FIGS. 12 and 13.

FIG. 15 is a side elevation view of the wear ring of FIG. 14.

FIG. 16 is a perspective view of the wear ring of FIG. 14.

DETAILED DESCRIPTION

Swivel joints are connections between pipe sections that contain bearings. The bearings allow the pipe sections to rotate about one another so that the pipe sections may be oriented in different directions. High pressure swivel joints are typically used with pipe assemblies that transfer fluid at high pressure and flow rates, such as 5,000 to 22,500 psi. A high pressure swivel joint, for example, may be used with pipe assemblies used in oil and gas hydraulic fracturing operations. It is important that high pressure swivel joints contain adequate seals to prevent fluid from leaking from the joint.

Figure 1:
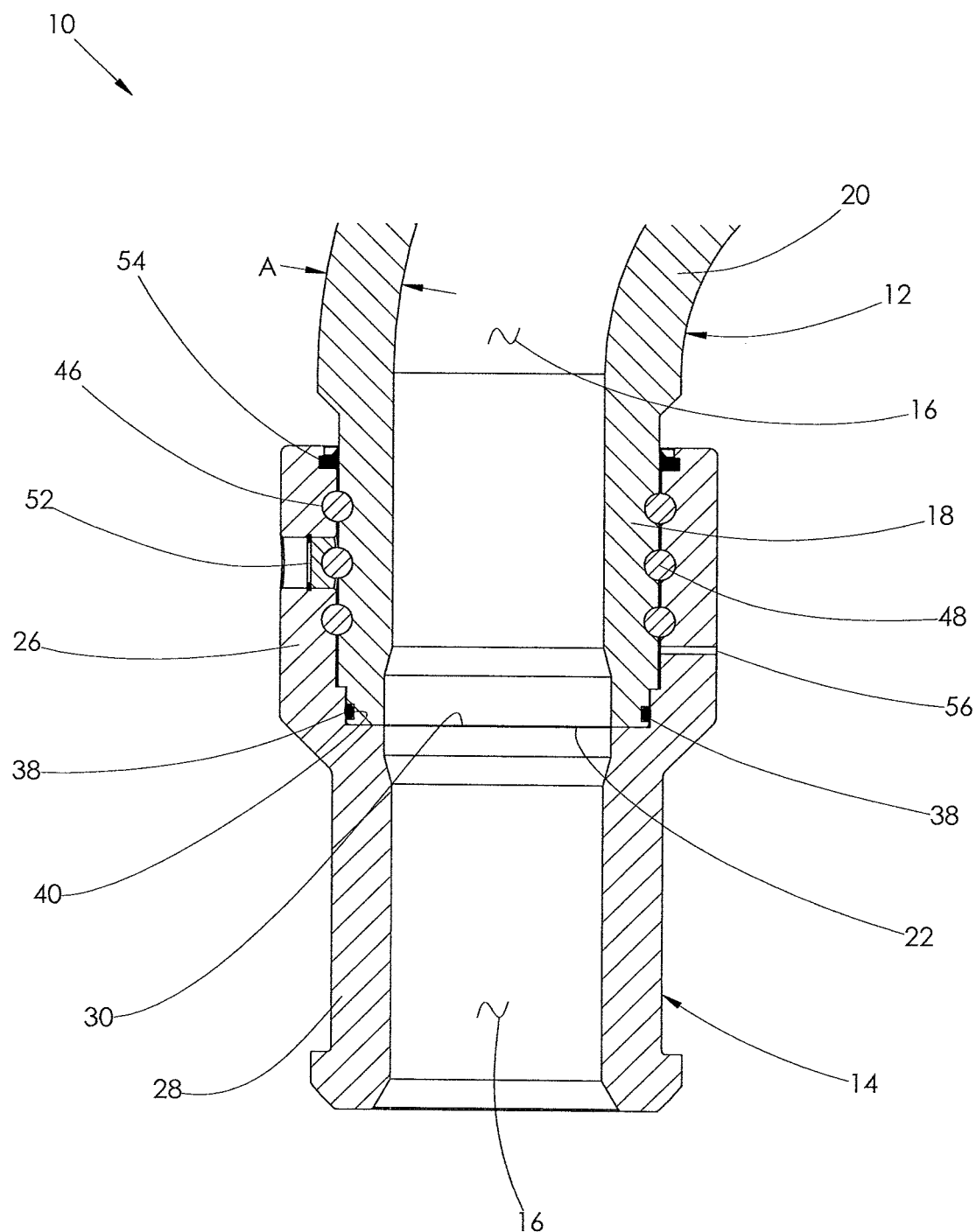
FIG. 1 is a cross-sectional view of a swivel joint of the present invention.
Figure 2:
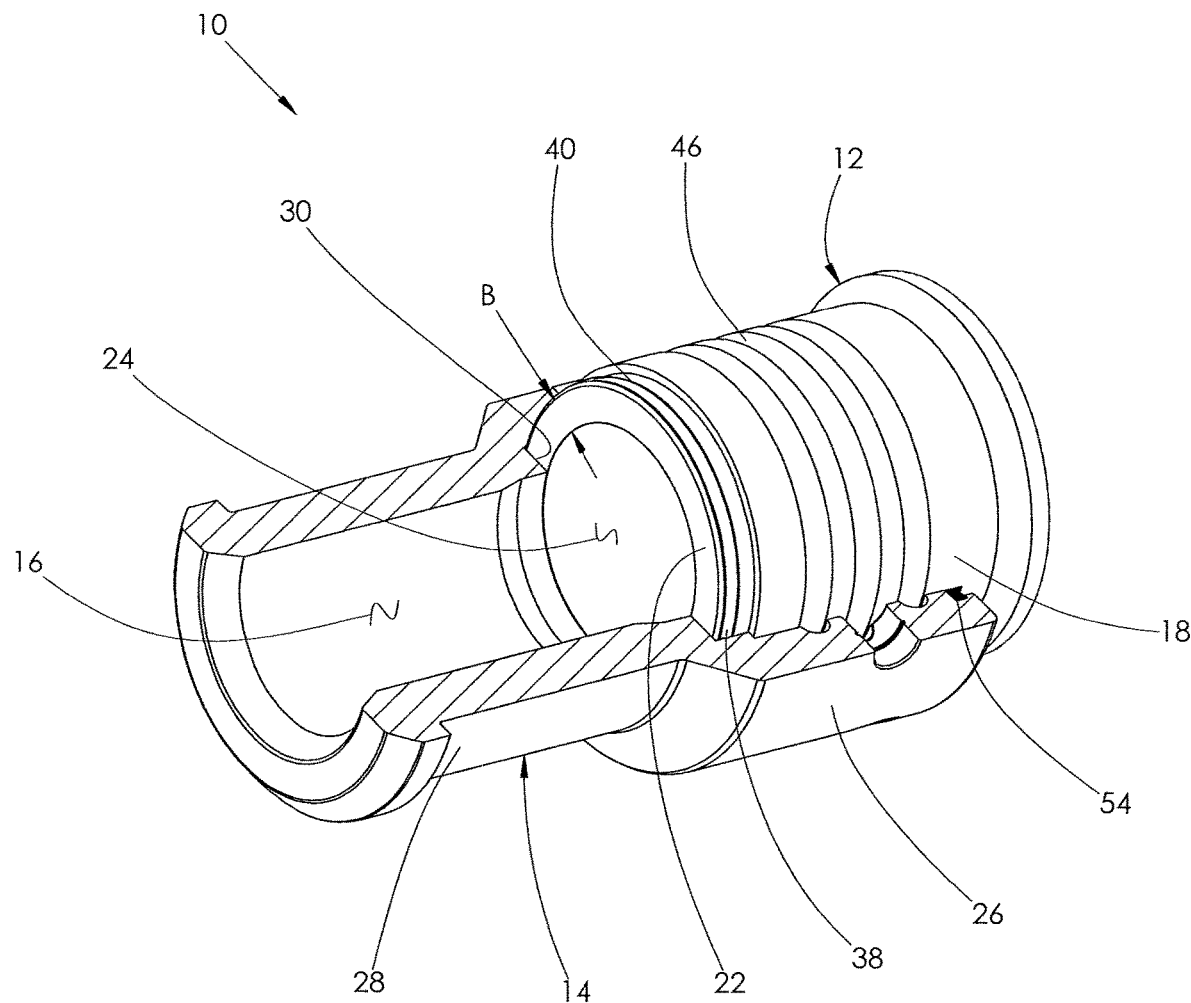
FIG. 2 is a perspective view of the swivel joint shown in FIG. 1. Portions of the second pipe section and seal have been cut away for better display.
Figure 3:
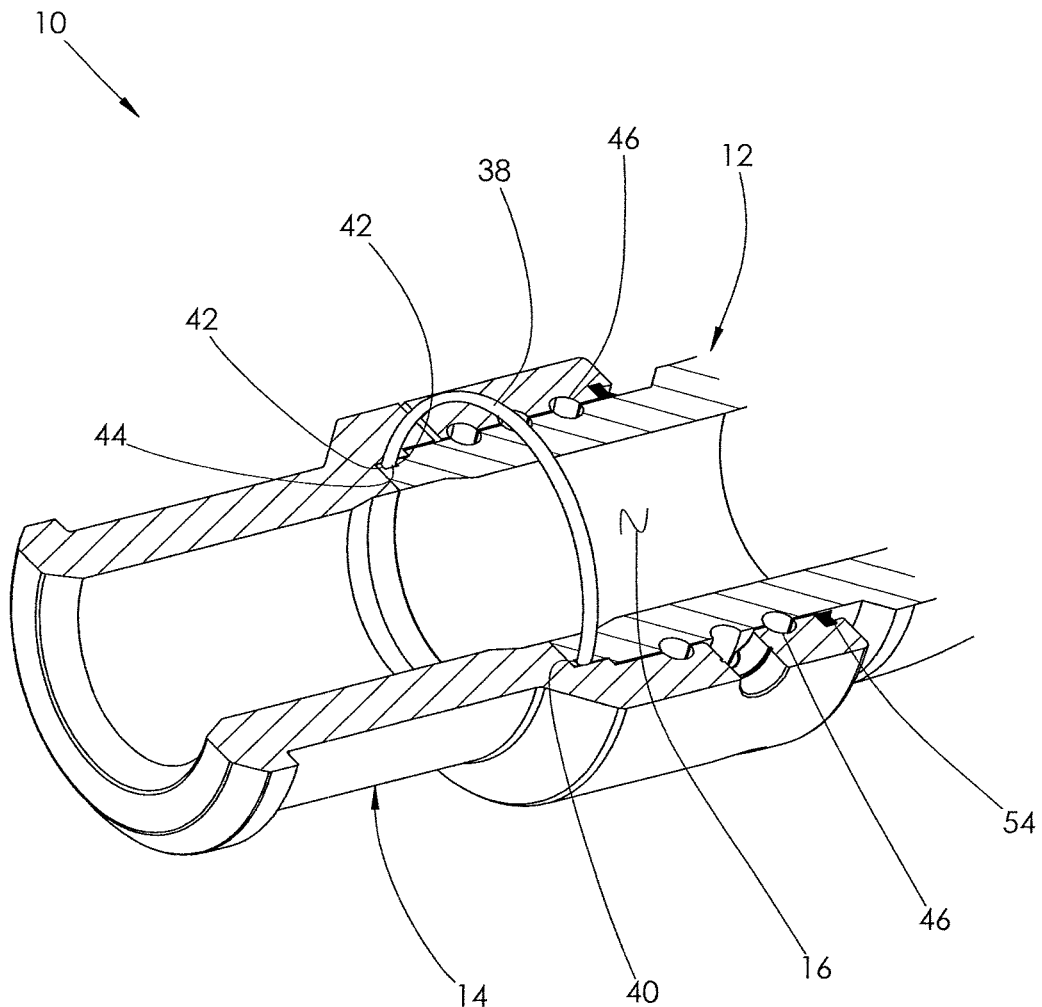
FIG. 3 is the perspective view of the swivel joint shown in FIG. 2. Portions of the first and second pipe sections have been cut away for better display. The seal within the swivel joint is shown intact.

With reference to FIGS. 1-3, a high pressure swivel joint 10 is shown. The joint 10 comprises a tubular first member or pipe section 12 and a tubular second member or pipe section 14. The pipe sections 12, 14 are preferably made out of metal. However, the pipe sections 12, 14 may be made out of other materials capable of withstanding high amounts of fluid pressure. A passage 16 is formed within each pipe section 12, 14. Fluid flows between the pipe sections 12, 14 through the passage 16.

Referring now to both FIGS. 1 and 2, the first pipe section 12 has a first end or connection end 18. The first end 18 is attached to or integral with an arcuate body section 20. A portion of the body 20 is shown in FIG. 1. The body 20 may connect to another pipe section at its opposite second end (not shown). The first end 18 has an external face or first surface 22. The first surface 22 is perpendicular to the longitudinal axis of the first end 18 and has an opening 24, as shown in FIG. 2. The opening 24 opens into the passage 16.

The second pipe section 14 has a connection end or sleeve 26. The sleeve 26 is attached to or integral with a linear body section 28. Alternatively, the body 28 may be arcuate in shape. The body 28 connects to another pipe section (not shown).

Figure 4:
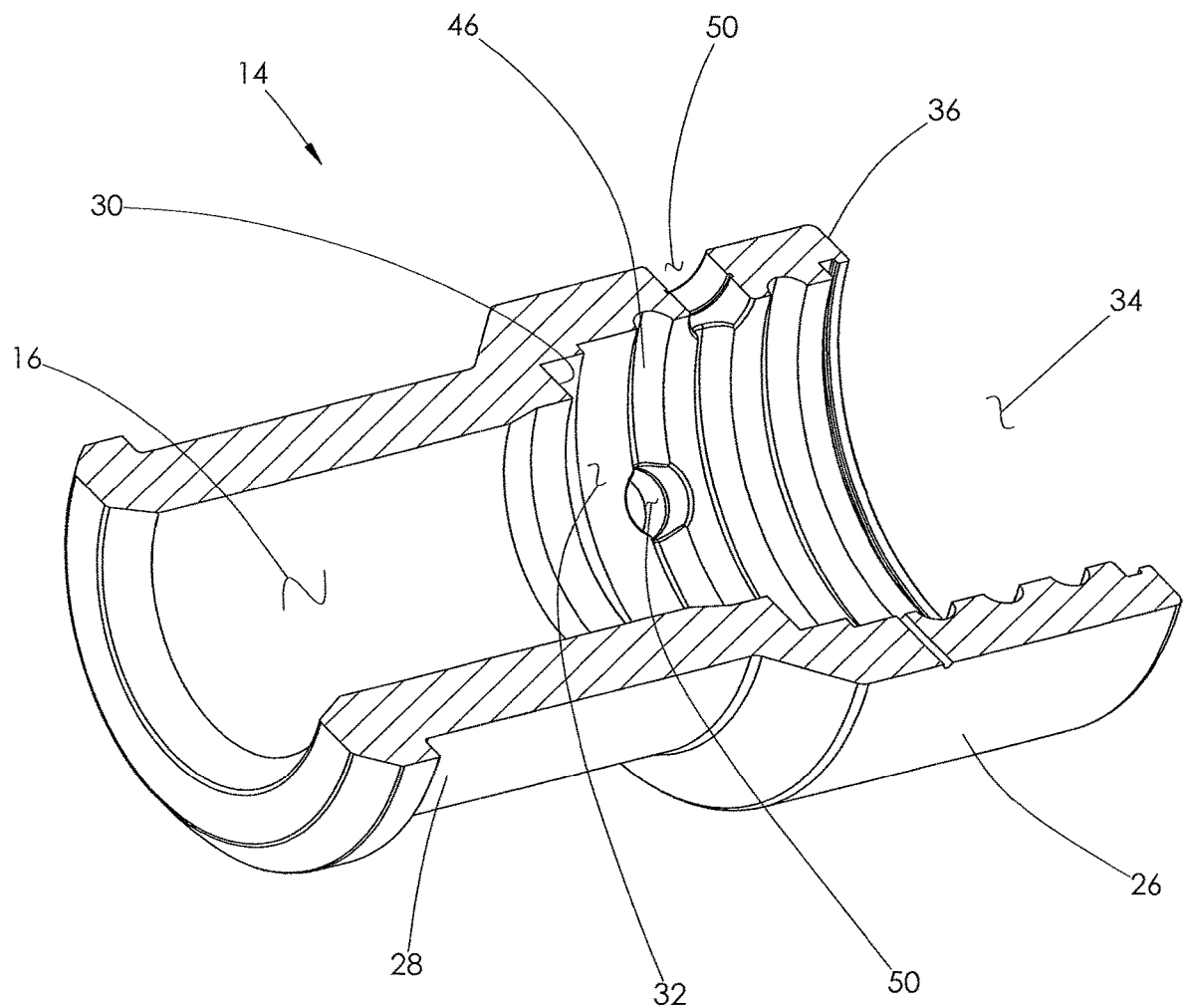
FIG. 4 is a cross-sectional view of the second pipe section shown in FIG. 3. The first pipe section and the seals are removed to better show the inner portions of the second pipe section.

The sleeve 26 has a recessed internal face or internal surface 30 that is perpendicular to the longitudinal axis of the sleeve 26 and has an opening 32, as shown in FIG. 4. The opening 32 opens into the passage 16. The sleeve 26 has a circular sleeve opening 34 formed at its first end 36. The diameter of the sleeve opening 34 is larger than the outside diameter of the first end 18 of the first pipe section 12. The first end 18 of the first pipe section 12 is coaxially received or disposed within the sleeve 26 through the sleeve opening 34. When the pipe sections 12, 14 are connected, the body 20 of the first pipe section 12 is in close proximity to the first end 36 of the sleeve 26.

Continuing with FIGS. 1-3, the joint to does not have a seal between the first surface 22 of the first end 18 and the internal surface 30 of the sleeve 26. Instead, the first surface 22 and the internal surface 30 are coaxial and in contact with one another. A seal or buffer may be placed between the surfaces 22, 30 to serve as a cushion.

Fluid is prevented from entering the joint 10 by a first radial seal 38. The seal 38 is annular and surrounds the outer circumference of the first end 18. The seal 38 is concentric with the first end 18 of the first pipe section 12, as shown in FIG. 3. The seal 38 is a rotary seal, meaning the seal 38 allows for rotation of the first end 18 within the sleeve 26. An example rotary seal is a u-cup seal. A u-cup seal may have a rectangular profile and contain a cup section and an annular lip. The seal 38 may also have a circular profile, like an O-ring.

The seal 38 may be made from any type of elastic material capable of sealing fluid. For example, the seal 38 may be made from nitrile, polyresin, silicone, or polyurethane. The seal 38 is preferably configured to withstand fluid pressure up to at least 22,500 psi.

The first seal 38 fits within a first annular groove 40. The groove 40 is formed around the outer surface of the first end 18 of the first pipe section 12. The groove 40 is axially spaced from the first surface 22 of the first end 18, and is characterized by a pair of parallel side walls 42 joined by a base 44, as shown in FIG. 3. When the seal 38 is inserted into the groove 40, the seal 38 will contact both side walls 42 and the base 44 of the groove 40. The seal 38 seals against the inner circumference of the sleeve 26, as shown in FIG. 1. The seal 38 does not contact either of the surfaces 22, 30. The seal 38 only contacts the groove 40 and the inner circumference of the sleeve 26.

The seal 38 may also be positioned around the first end 18 and axially spaced from the first surface 22, but not positioned within a groove. In such embodiment, the first end 18 would not contain the groove 40. Instead, the seal 38 would be radially compressed between the first end 18 and the sleeve 26.

During operation, high pressure fluid passing through the joint 10 may cause the pipe sections 12, 14 to pulsate, which may cause damage to the surfaces 22, 30 or surrounding areas of the pipe sections. For example, the surfaces 22, 30 may chip or warp. Over time, the high pressure fluid may also corrode or erode the surfaces 22, 30 or surrounding areas of the pipe sections 12, 14. If the surfaces 22, 30 or surrounding areas are damaged or eroded, fluid may leak during operation from between the surfaces 22, 30.

The seal 38 is not affected by damage to or erosion of the surfaces 22, 30, because the seal 38 is not positioned between the surfaces 22 and 30. Rather, the seal 38 is axially spaced from the surfaces 22, 30 and functions as a radial seal. Any fluid that leaks from between the surfaces 22, 30 will be stopped by the seal 38. In contrast, damage to or erosion of the surfaces 22, 30 might prevent a facial or packing seal positioned between the surfaces 22, 30 from sealing properly. Proper sealing is prevented because some of the sealing surface of the surfaces 22, 30 has been lost, resulting in gaps for fluid to pass through.

The surfaces 22, 30 may also need to be polished or ground during its lifetime to keep the joint 10 operating properly. This is considered the rebuilding or reworking of the joint 10. The rebuild or rework of the joint 10 may decrease the surface area of the surfaces 22, 30, further decreasing the compression of the surfaces 22, 30 upon each other during operation. If a packing seal is used, the surfaces 22, 30 may no longer seal properly against the packing seal if the joint to has been rebuilt. However, the seal 38 is not affected by the rework process because the seal is spaced axially from the surfaces 22, 30 of the pipe sections 12, 14.

The seal 38 is also not affected by the pulsations of the pipe sections 12, 14, because it is not repeatedly compressed by the surfaces 22, 30 as the pipe sections 12, 14 pulsate. In contrast, the pulsation of the pipe sections 22, 30 will continually compress a packing seal used between the surfaces 22, 30, which may cause damage to the packing seal and prevent it from sealing properly. High pressure fluid flowing through the joint 10 may also cause the pipe sections 12, 14 to separate. Unlike a packing seal, the sealing ability of the seal 38 is not affected by separation of the pipe sections 12, 14.

Referring now to FIGS. 1-4, a series of annular bearing races 46 are formed in the outer surface of the first end 18 of the first pipe section 12 and the inner surface of the sleeve 26. The bearing races 46 hold a plurality of bearings 48. The bearings 48 are preferably ball bearings. The bearings 48 allow the pipe sections 12, 14 to rotate about one another so that the pipe sections 12, 14 may be oriented in different directions.

The bearings 48 may be incorporated into the joint 10 after the pipe sections 12, 14 are joined together. To do this, a bearing opening 50 is formed in the center of each bearing race 46 in the sleeve 26. As shown in FIG. 4, the bearing openings 50 are radially spaced around the sleeve 26. The bearings 48 may be inserted into the bearing races 46 through the bearing openings 50. Once each bearing race 46 is filled with bearings 48, a plug 52, shown in FIG. 1, may be inserted into each bearing opening 50 to secure the bearings 48 within the joint 10. The pipe sections 12, 14 remain connected to form the joint 10 after the bearings 48 are inserted, because the bearings 48 prevent relative longitudinal movement between the pipe sections 12, 14.

Grease is used to lubricate the bearings 48. Grease may be incorporated into the joint 10 through the plug 52 using a grease zerk and grease gun (not shown). The grease zerk may thread into the plug 52 and feed grease from the grease gun into the joint 10. The grease is maintained within the joint to via a low pressure seal 54. The low pressure seal 54 may only seal fluid up to 100 psi or less. The low pressure seal 54 is annular and positioned around the outer circumference of the first end 18 of the first pipe section 12 proximate the first end 36 of the sleeve 26. The low pressure seal 54 also prevents outside contaminants from entering the joint 10.

With reference to FIG. 1, a weep hole 56 is formed in the sleeve 26 between the seal 38 and the bearings 48. The weep hole 56 is a narrow passage that interconnects the inner and outer surface of the sleeve 26. If any fluid leaks around the seal 38 during operation, the fluid may be drained from the joint 10 through the weep hole 56. The weep hole 56 helps prevent any fluid within the joint 10 from reaching the bearings 48.

Continuing with FIG. 1, the body section 20 has a wall thickness A. The high pressure fluid passing through the joint 10 may erode at the first wall thickness A over time. Due to this, the wall thickness is ordinarily used in swivel joints 10 to judge the wear on the joint to determine whether or not the joint 10 has entered a failure mode. If the wall thickness A of the joint 10 has decreased beyond a certain threshold, the joint 10 may no longer be considered suitable for use. For example, the joint to may no longer be considered suitable for use if the wall thickness A has decreased by 50% or 70%, depending on the characteristic of the body section 20.

With reference to FIGS. 1-2, the first surface 22 has a second wall thickness B, as shown in FIG. 2, that may be smaller than A. The wall thickness B also has a failure mode. The wall thickness B is considered to have failed if the wall thickness has decreased so that the joint 10 is no longer properly sealed. If a facial or packing seal placed between the surfaces 22, 30 is used instead of the radial seal 38, the thickness B may fail before the thickness A fails. This is because the packing seal will lose its sealing ability if the thickness of B is reduced. In contrast, the sealing ability of the radial seal 38 is not affected by a decrease in thickness of B. Therefore, by using a radial seal 38, the thickness A will reach the failure mode before the thickness B.

Figure 11:
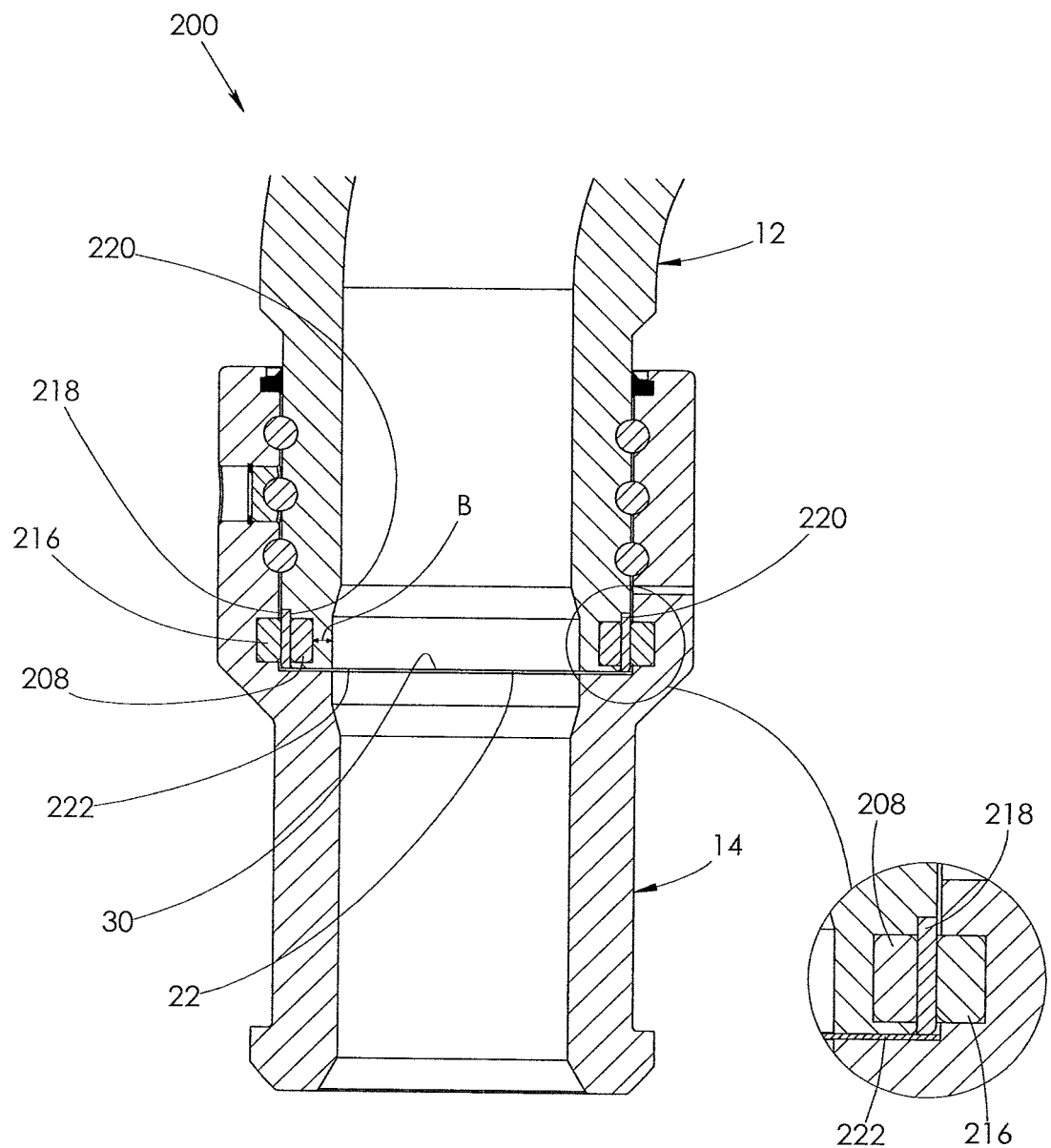
FIG. 11 is a cross-sectional view of another embodiment of the swivel joint, similar to that shown in FIG. 10, but a gasket has been added between the pipe sections. A portion of the swivel joint is shown enlarged for better display.

The thickness B may also be increased throughout the embodiments discussed herein. Increasing the thickness B extends the amount of time the first surface 22 will seal properly before it fails. An example of an increased wall thickness B is shown in FIG. 11.

Figure 5:
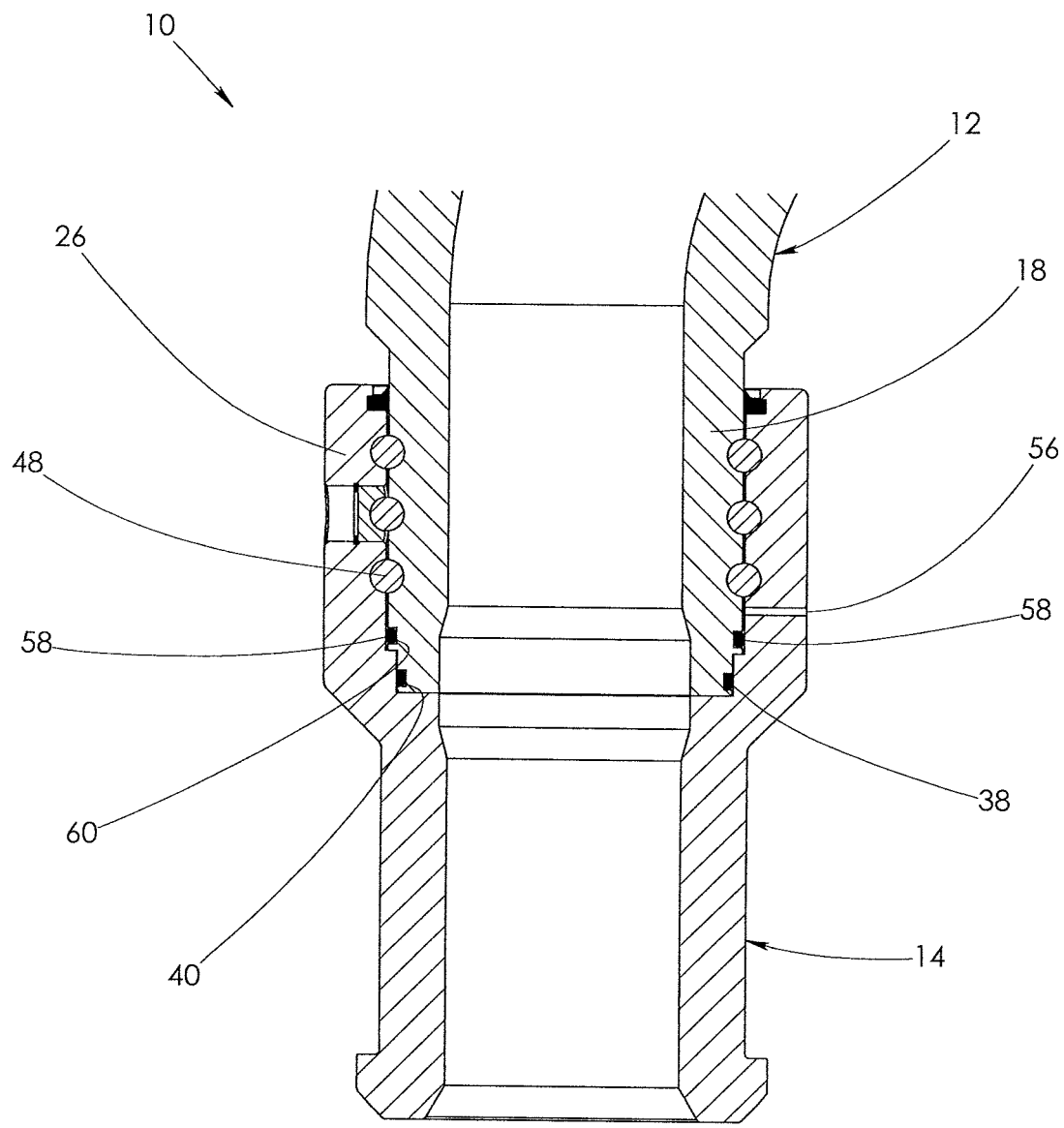
FIG. 5 is a cross-sectional view of another embodiment of the swivel joint, similar to that shown in FIG. 1, but with a second seal added.

Turning now to FIG. 5, a second radial seal 58 may also be used in the joint 10. The second seal 58 may be positioned axially between the first radial seal 38 and the weep hole 56. Alternatively, the second seal 38 may be positioned between the weep hole 56 and the bearings 48. The second seal 58 may serve as a back-up seal if fluid starts to leak past the first seal 38. The second seal 58 may have a circular profile. For example, the second seal 58 may be an O-ring. Alternatively, the second seal 58 may have a rectangular profile. The second seal 58 may also be a rotary seal. The second seal 58 may be made out of an elastic material capable of sealing fluid, such as nitrile, polyresin, silicone, or polyurethane.

The second radial seal 58 may be inserted into a second annular groove 60 that is identical to the first groove 40. However, the second groove 60 may be smaller in size depending on the size of the second seal 58. The second seal 58 may also just fit around the outer circumference of the first end 18.

Figure 6:
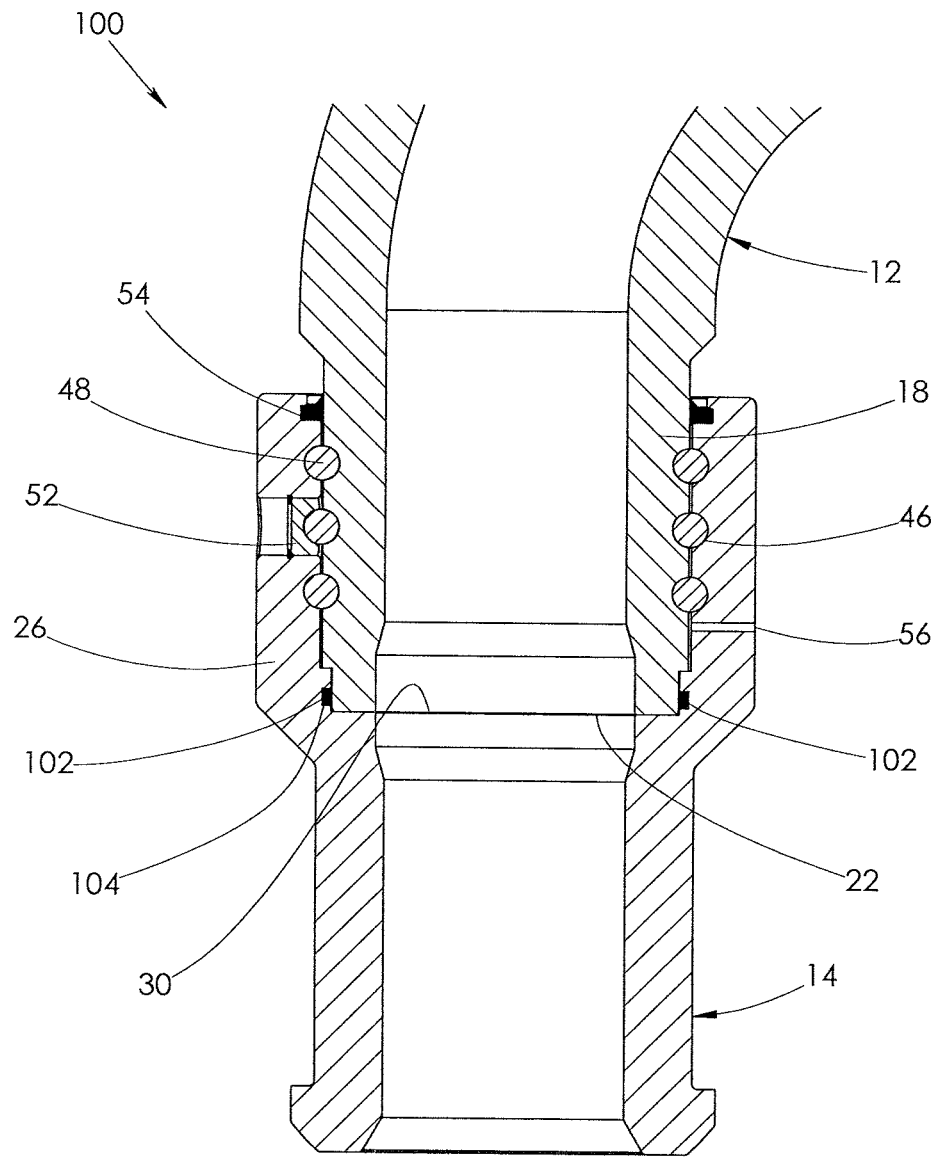
FIG. 6 is a cross-sectional view of an alternative embodiment of the swivel joint of the present invention.
Figure 7:
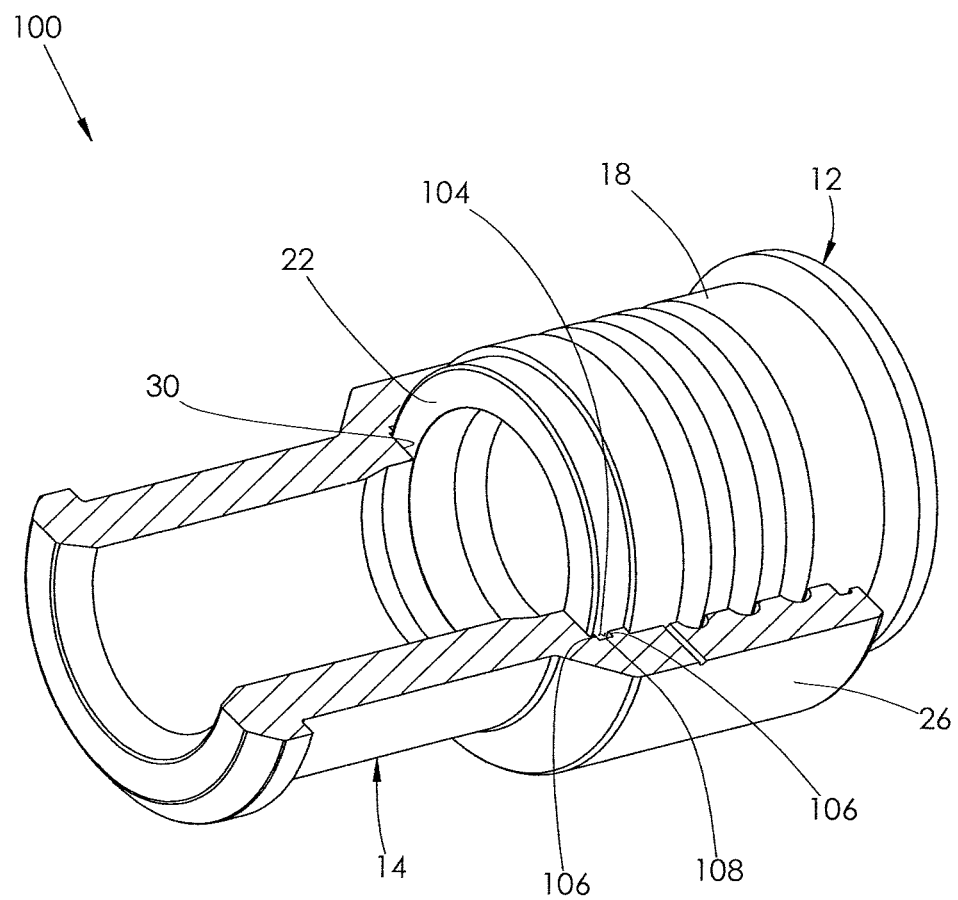
FIG. 7 is a perspective view of the swivel joint shown in FIG. 6. Portions of the second pipe section and seal have been cut away for better display.
Figure 8:
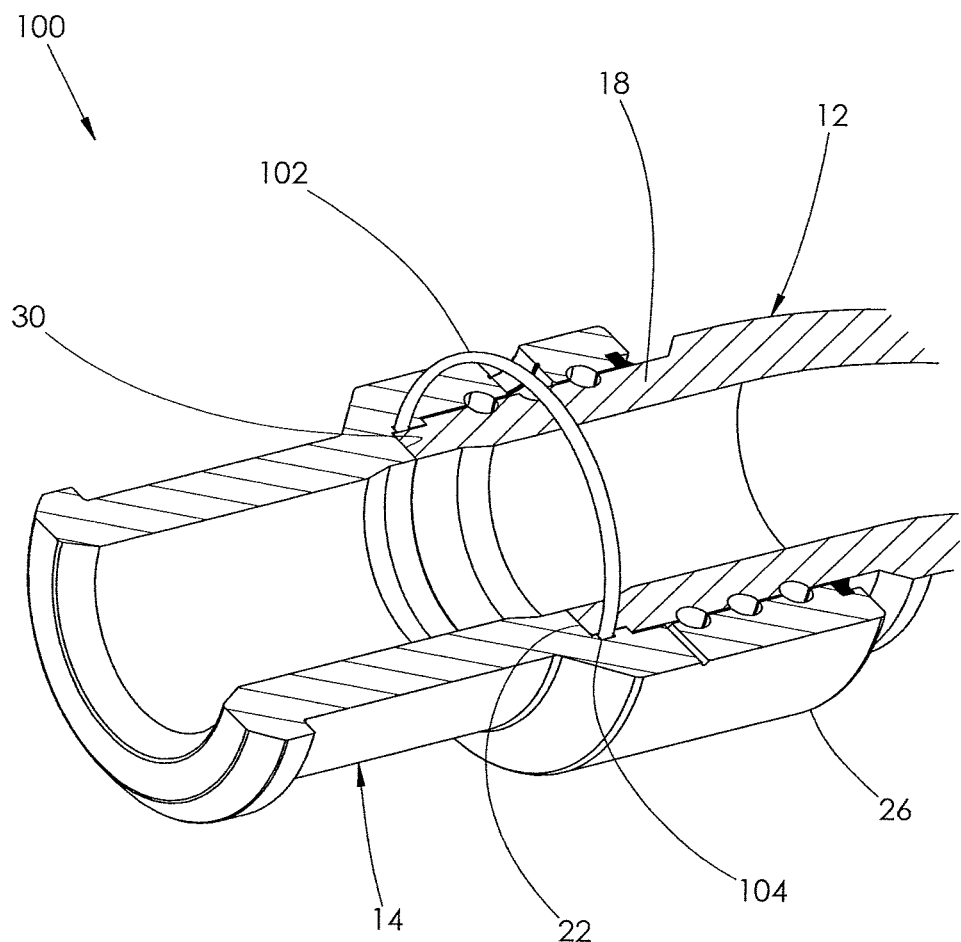
FIG. 8 is the perspective view of the swivel joint shown in FIG. 7. Portions of the first and second pipe sections have been cut away for better display. The seal within the swivel joint is shown intact.

Turning now to FIGS. 6-8, an alternative embodiment of the high pressure swivel joint 100 is shown. The joint 100 does not contain the seal 38 and groove 40. Instead, the joint 100 comprises a first radial seal 102 that is positioned in a first annular groove 104. The remaining components of the joint 100 are identical to those in joint 10, shown in FIG. 1.

The groove 104 is formed around the inner surface of the sleeve 26, rather than the outer surface of the first end 18, as shown in FIG. 1. The groove 104 is axially spaced from the internal surface 30 of the sleeve 26, and is characterized by a pair of parallel side walls 106 joined by a base 108, as shown in FIG. 7.

Like the seal 38, the seal 102 is a rotary seal that allows for rotation of the first end 18 within the sleeve 26. For example, the seal 102 may be a u-cup seal or have a rectangular profile. Alternatively, the seal 102 may have a circular profile. The seal 102 may be made from an elastic material capable of sealing fluid.

The seal 102 contacts the side walls 106 and the base 108 of the groove 104 when inserted into the groove 104. The seal 102 seals against the outer surface of the first end 18 of the first pipe section 12. The seal 102 does not contact either of the surfaces 22, 30. The seal 102 only contacts the groove 104 and the outer circumference of the first end 18 of the first pipe section 12.

Figure 9:
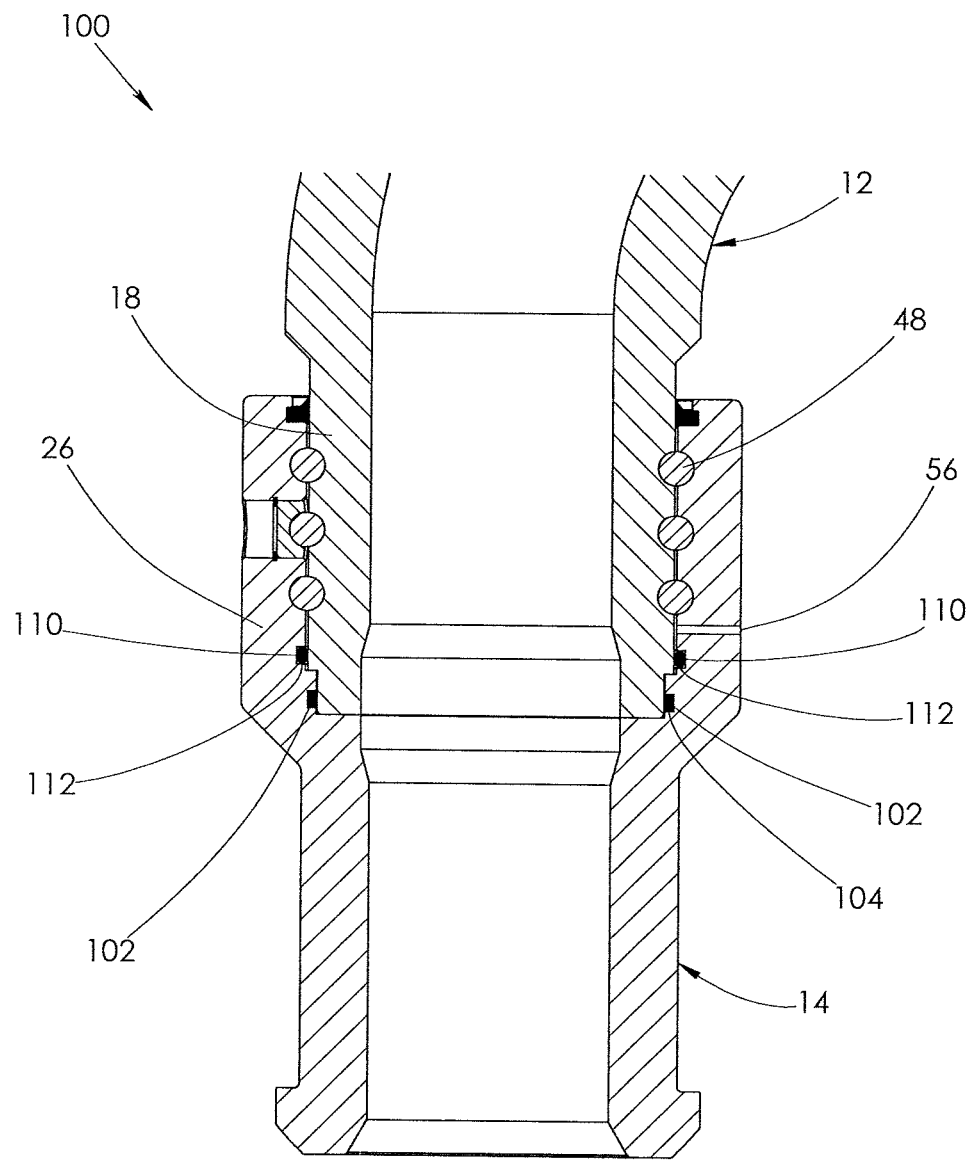
FIG. 9 is a cross-sectional view of another embodiment of the swivel joint, similar to that shown in FIG. 6, but with a second seal added.

Turning now to FIG. 9, a second radial seal 110 may also be used in the joint 100. The second seal 110 may be positioned axially between the first radial seal 102 and the weep hole 56, as shown in FIG. 9. Alternatively, the second seal 110 may be positioned between the weep hole 56 and the bearings 48. The second seal 110 may serve as a back-up seal if fluid starts to leak past the first seal 102. The second seal 110 may have a circular profile. For example, the second seal 110 may be an O-ring. Alternatively, the second seal 110 may have a rectangular profile. The second seal 110 may also be a rotary seal. The second seal 110 may be made out of an elastic material capable of sealing fluid, such as nitrile, polyresin, silicone, or polyurethane.

The second seal 110 may be inserted into a second annular groove 112 that is identical to the first groove 104. However, the second groove 112 may be smaller in size depending on the size of the second seal 11o. The second seal 110 may also just fit around the outer circumference of the first end 18.

Turning back to FIG. 5, during operation, the first seal 38 will wear against the inner circumference of the sleeve 26. Over time, such wear may affect the ability of the seal 38 to seal properly against the sleeve 26. In such case, the second pipe section 14 will need to be replaced. However, the groove 40 in the first end 18 and the surrounding area of the first end 18 should remain relatively intact. This is because wear from the seal 38 is transferred to the inner circumference of the sleeve 26. If a second seal 58 is used, the wear from the second seal 58 will also be transferred to the sleeve 26.

Likewise, with reference to FIG. 9, the first seal 102 will wear against the outer circumference of the first end 18 of the first pipe section 12 during operation. Over time, such wear may affect the ability of the seal 102 to seal properly against the first end 18. In such case, the first pipe section 12 will need to be replaced. However, the groove 104 in sleeve 26 and the surrounding area of the sleeve 26 should remain relatively intact. This is because wear from the seal 102 is transferred to the outer circumference of the first end 18 of the first pipe section 12. If a second seal 110 is used, the wear from the second seal 110 will also be transferred to the sleeve 26. An operator may choose which embodiment of the joint 10 or 100 to use based on which pipe section 12, 14 the operator prefers to replace over time.

Figure 10:
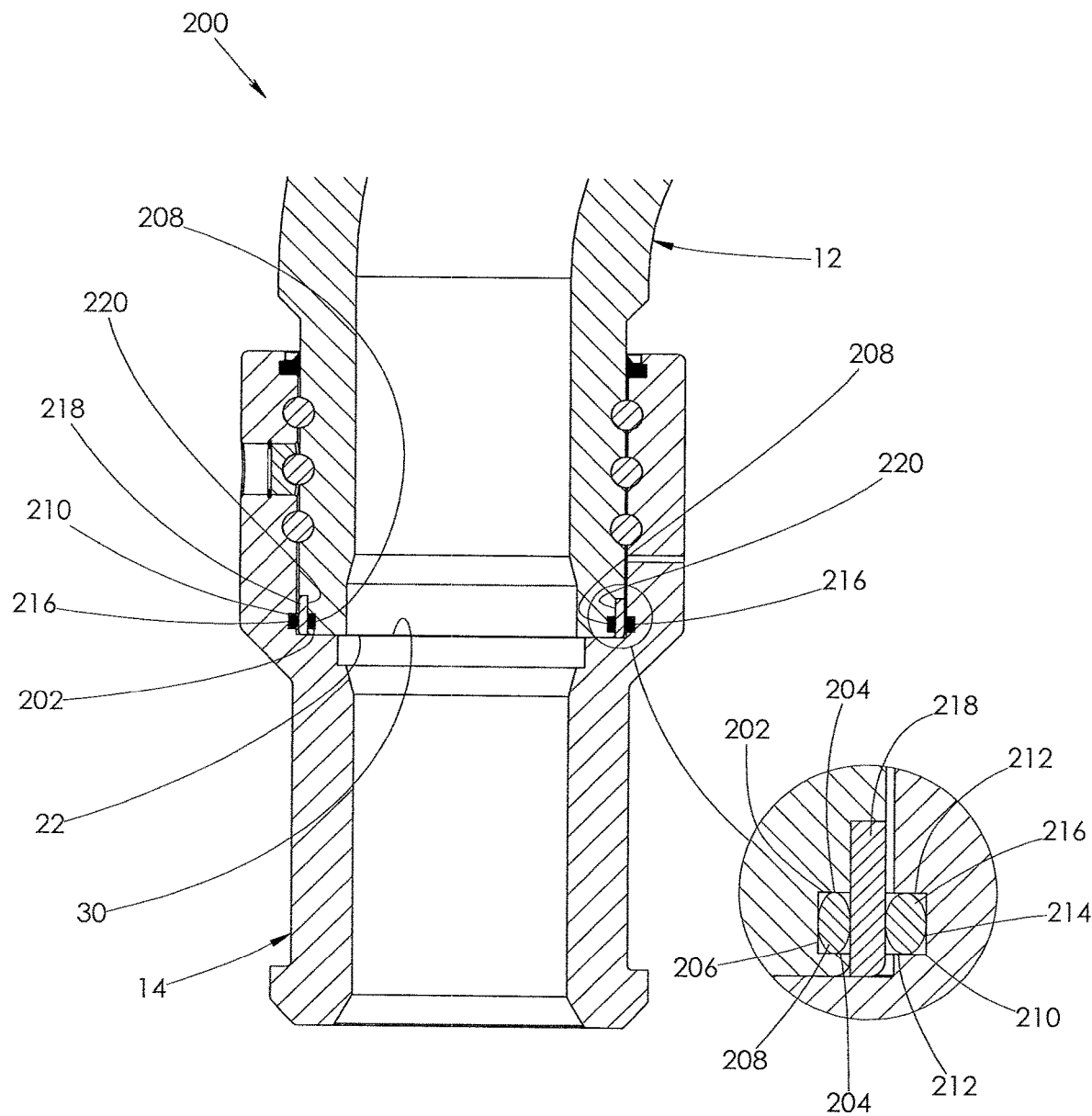
FIG. 10 is a cross-sectional view of another embodiment of the swivel joint of the present invention. A portion of the swivel joint is shown enlarged for better display.

Turning now to FIGS. 10-11, an alternative embodiment of the swivel joint 200 is shown. The first end 18 of the first pipe section 12 has a first annular groove 202 formed around its outer surface. The first groove 202 is axially spaced from the first surface 22 and is characterized by side walls 204 joined by a base 206. A first radial seal 208 is positioned within the first groove 202. At least a portion of the first seal 208 contacts both side walls 204 and the base 206 of the groove 202 when the first seal 208 is positioned within the first groove 202.

The sleeve 26 has a second annular groove 210 formed around its inner surface. The second groove 210 is axially spaced from the internal surface 30 and is characterized by side walls 212 joined by a base 214. A second radial seal 216 is positioned within the second groove 210. At least a portion of the second seal 216 contacts both side walls 212 and the base 214 of the groove 210 when the second seal 216 is positioned within the second groove 210. Like the seals 38 and 102, the first and second seals 208 and 216 may have a circular or a rectangular profile and be made out of an elastic material capable of sealing fluid, such as nitrile, polyresin, silicone, or polyurethane.

As shown in FIG. 10, the first groove 202 and the second groove 210 are coaxial. An annular wear ring 218 is positioned between the grooves 202 and 210. The wear ring 218 has a rectangular profile. The seals 208 and 216 seal against opposite sides of the wear ring 218. The wear ring 218 need only be wide enough axially to provide a contact surface for the seals 208, 216, but may be wider. The wear ring 218 is held in place because it is situated between an annular shoulder 220 formed on the first end 18 of the first pipe section 12 and the internal surface 30 of the sleeve 26. The wear ring 218 may be made of a hardened material, such as stainless steel.

During operation, the first seal 208 and the second seal 216 will wear against opposite sides of the wear ring 218. Any damage caused by the seals 208 and 216 rubbing against the wear ring 218 will be primarily inflicted on the wear ring 218. The seals 208, 216 and grooves 202 and 210 will remain relatively intact. Due to this, only the wear ring 218 will need to be replaced over time, rather than one of the pipe sections 12, 14. The wear ring 218 may also be formed out of a material that is resistant to corrosion to lengthen the life of the wear ring 218.

A rubber gasket 222 may also be bonded to the base of the wear ring 218, as shown in FIG. 11. The gasket 222 may act as a facial seal between the surfaces 22, 30. The gasket 222 may help cushion and reduce friction between the surfaces 22, 30 during operation.

To manufacture the swivel joints 10, 100, or 200, the pipe sections 12, 14 are first machined from pieces of metal. The shape of the pipe sections 12, 14 and the features, such as the bearing races 46 and bearing openings 50, are formed at the time the pipe sections 12, 14 are machined. After the pipe sections 12, 14 are machined, the pipe sections 12, 14 are typically heat treated. Heat treating the pipe sections increases the hardness of the pipe sections 12, 14 and helps resist against corrosion. The pipe sections 12, 14 are typically heated up to 1,800-1,900° F.

The problem with heat treating the pipe sections 12, 14 after they are machined is that the pipe sections 12, 14 may become distorted during the heat treatment process. If the pipe sections 12, 14 are distorted during heat treatment, it may be difficult to get the pipe sections 12, 14 to seal properly. Additionally, if the bearing races 46 are distorted during the heat treatment, the joints 10, 100, and 200 will not rotate properly.

One way to prevent distortion of the pipe sections 12, 14 during the heat treatment is to increase the wall thickness of the first end 18 and the sleeve 26. The thicker the walls, the less likely the pieces will distort during heat treatment. A grinding operation may also be used after the first end 18 and the sleeve 26 are heat treated to remove any distortion in the pieces. The thicker the walls of the first end 18 and the sleeve 26, the more surface area available to grind the pieces to the appropriate specifications.

Another method for preventing distortion is to heat treat the metal before the joint 10, 100 or 200 is machined. This would avoid any unwanted distortion caused to the machined areas by the heat treatment. The bearing races 46 may be machined over-sized after the pipe sections 12, 14 are heat treated, and then coated to a desired depth with a special coating. The coating may be any thermal spray coating, HVOF coating, or Nano-layered coating such as Modumetal. The coating is then ground to the desired specifications. The coating may serve as a hardened surface on the bearing races 46 for the bearings 48 to rotate within. The coating may also be used on the surfaces 22, 30 and ground to the desired specifications.

After the pipe sections 12, 14 are machined, the grooves 40, 104, 202 or 210 may be formed in the first end 18 and/or the sleeve 26. Following formation of the grooves 40, 104, 202 or 210, the seals 38, 102, 208 or 216 may be inserted into the groove(s). Once the seals 38, 102, 208 or 216 are in place, the first end 18 may be inserted in the sleeve 26. The bearing races 46 are each filled with bearings 48 by inserting the bearings 48 through the bearing openings 50. The plugs 52 may then be secured within each bearing opening 50. Grease may be inserted into the joint 10, 100, or 200 through the plugs 52. Once the joint 10, 100, or 200 is filled with grease, the joint may be incorporated for use in a pipe assembly.

Figure 12:
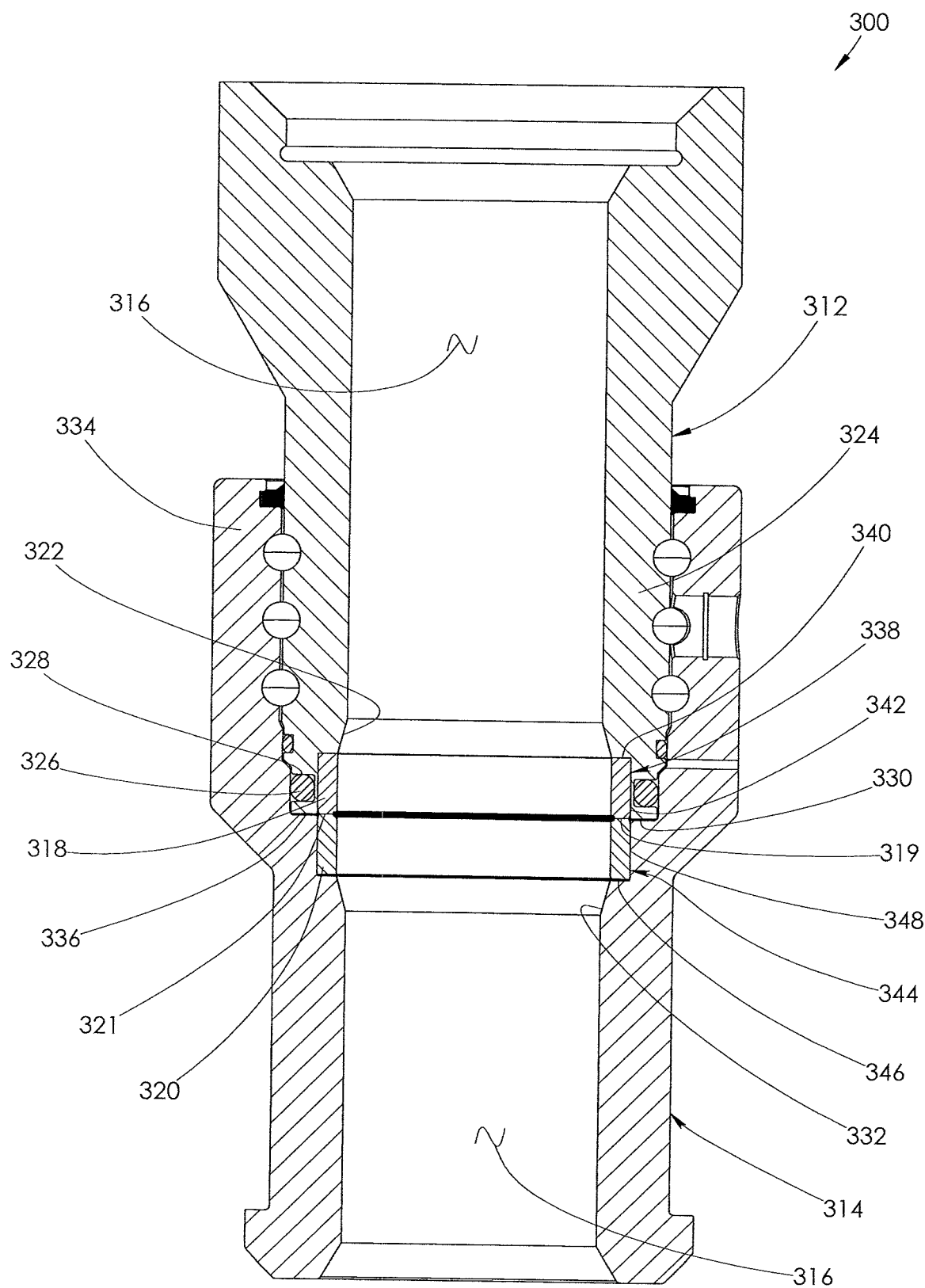
FIG. 12 is a cross-sectional view of another embodiment of the swivel joint of the present invention.

Turning now to FIG. 12, an alternate embodiment of the swivel joint 300 is shown. The joint 300 comprises a tubular first member or pipe section 312 and a tubular second member or pipe section 314. Fluid flows between the pipe sections 312, 314 through a passage 316.

The pipe sections 312 and 314 have substantially the same shape and construction as the pipe sections 12 and 14, shown in FIG. 5. However, unlike pipe sections 12 and 14, a first wear ring 318 and a second wear ring 320 are positioned around the inner diameters of the pipe sections 312 and 314.

Over time, wear may occur to an inner wall 322 of a connection end or first end 324 of the first pipe section 312. The wear may occur proximate a seal 326 positioned in an annular groove 328 formed in the first section 312 and axially spaced from a first surface 330 of the first section 312. The wear may cause the inner wall 322 of the first end 324 to start to erode towards the groove 328. The inner wall 322 may erode so much that the integrity of the groove 328 is compromised.

Wear may also occur over time to an inner wall 332 of a connection end or sleeve 334 of the second pipe section 314. The wear may occur adjacent a recessed internal surface or face 336 formed in the sleeve 334. If wear occurs to the inner walls 322 and 332 of the pipe sections 312, 314, the joint 300 may no longer seal properly.

To prevent excess wear or erosion to the inner wall 322 of the first end 324, the first wear ring 318 may be positioned around the inner wall 322 of the first end 324. Likewise, to prevent excess wear or erosion to the inner wall 332 of the sleeve 334, the second wear ring 320 may be positioned around the inner wall 332 of the sleeve 334.

As fluid passes through the joint 300, the fluid may wear against the wear ring 318 or 320 instead of the inner walls 322 or 332 of the first end 324 or sleeve 334. Thus, the erosion caused by the wear is imparted to the wear ring 318 or 320 and not the inner walls 322 or 332. If the wear ring 318 or 320 has suffered too much wear, it can be replaced with a new wear ring. This helps to extend the life of the first end 324 and the sleeve 334.

The first wear ring 318 is positioned within a first annular recess 338 formed in the inner wall 322 of the first pipe section 312 and extending from its connection end 324. The recess 338 is bounded by a side wall 340 joined to a base 342. The recess 338 surrounds the fluid passage 316 and is concentric with it.

Likewise, the second wear ring 320 is positioned within a second annular recess 344 formed in the inner wall 332 of the second pipe section 314 and extends from its internal face 336. The recess 344 is bounded by a side wall 346 joined to a base 348. The recess 344 surrounds the fluid passage 316 and is concentric with it.

With reference to FIGS. 14-16, the first wear ring 318 is shown in more detail. The first wear ring 318 has a first surface 319 joined to a second surface 321 by parallel side walls 323. The first wear ring 318 has a rectangular cross-sectional shape. In alternative embodiments, the wear ring 318 has a circular cross-sectional shape. To lengthen its life, the wear ring 318 is preferably formed from a hardened material that is resistant to corrosion, such as stainless steel. The second wear ring 320 has the same shape and construction as the first wear ring 318. The wear rings 318 and 320 are formed as separate pieces from the pipe sections 312 and 314.

Turning back to FIG. 12, the wear rings 318 and 320 are removable from the pipe sections 312 and 314. The first wear ring 318 fits tightly between the side wall 340 of the recess 338 and the first surface 319 of the second wear ring 320. The second wear ring 320 fits tightly between the side wall 346 of the recess 344 and the second surface 321 of the first wear ring 318. These tight fits restrain the rings' 318, 320 axial movement. Lateral movement of each of the wear rings 318 and 320 is restrained by the base 342, 348 of the recess 338, 344 within which it is received. Each wear ring 318, 320 may be press fit or slip fit within its associated recess 338, 344.

Each of the wear rings 318 and 320 may rotate with its corresponding end when the swivel joint 300 is in use. In another embodiment, a seal or buffer (not shown) may be placed between the wear rings 318 and 320 to serve as a cushion.

While two wear rings are included in the embodiment shown in FIG. 12, other embodiments of a swivel joint may include only a single wear ring. For example, a swivel joint may include only a first wear ring within the first pipe section. Such a wear ring is held in place by the recess 338 and the internal surface 336 of the sleeve 334. Similarly, a swivel joint may include only a second wear ring within the section pipe section. Such a wear ring is held in place by the recess 344 and the first surface 330 of the first end 324.

Figure 13:
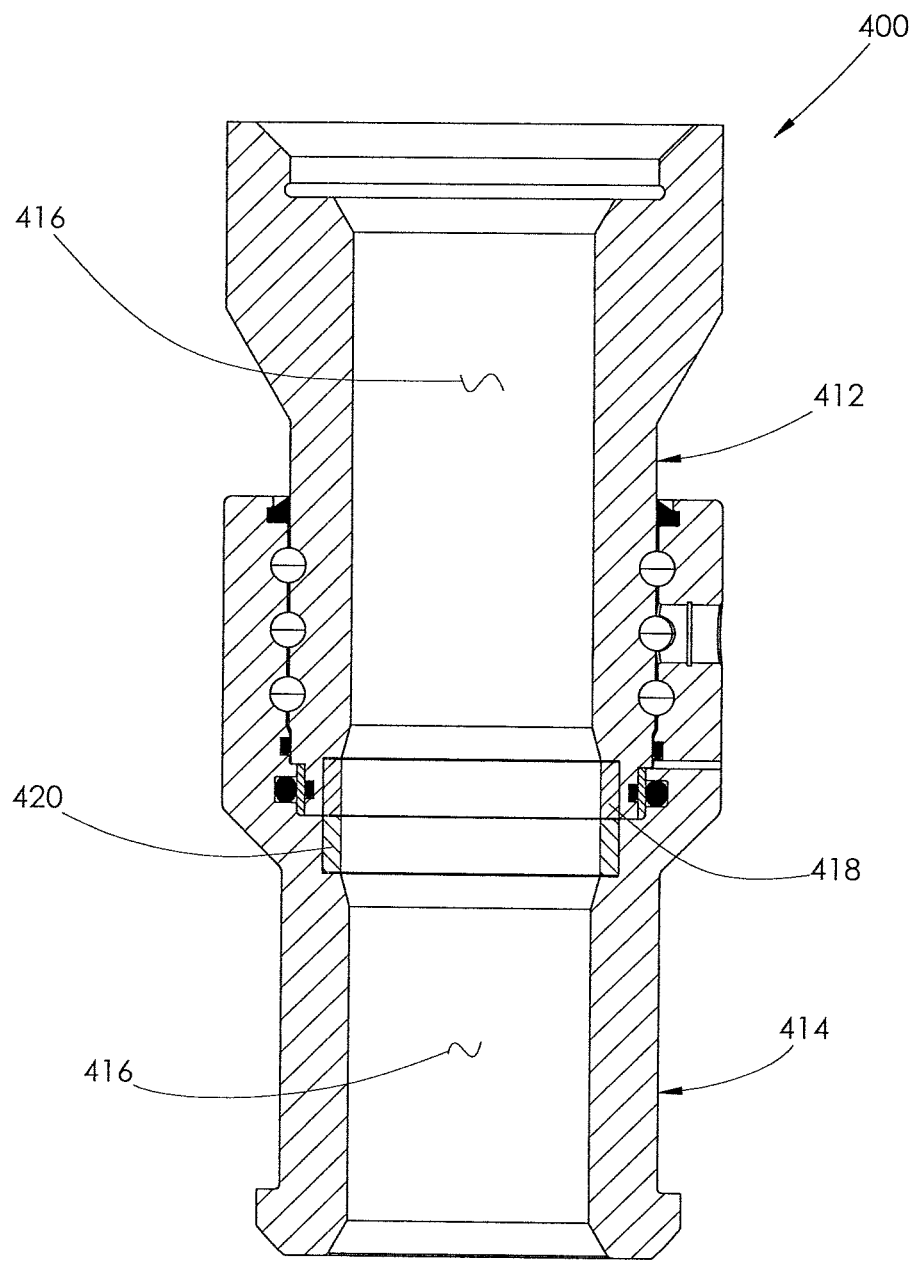
FIG. 13 is a cross-sectional view of another embodiment of the swivel joint of the present invention.

Turning now to FIG. 13, another embodiment of the swivel joint, designated by reference number 400, is shown. The joint 400 comprises a tubular first member or pipe section 412 and a tubular second member or pipe section 414. Fluid flows between the pipe sections 412, 414 through a passage 416.

The pipe sections 412 and 414 have substantially the same shape and construction as the pipe sections 12 and 14, shown in FIG. 10. However, unlike pipe sections 12 and 14, a first wear ring 418 and a second wear ring 420 are positioned around the inner diameters of the pipe sections 412 and 414. The wear rings 418 and 420 have the same shape and construction as the wear rings 318 and 320, shown in FIG. 12. The wear rings 418 and 420 are installed within the first and second pipe sections 412 and 414 in the same manner that the wear rings 318 and 320 are installed within the pipe sections 312 and 314.

Except as otherwise noted herein, the swivel joints 300 or 400 are manufactured in the same way as the swivel joints 10, 100, or 200. The wear rings 318 and 320 may be incorporated into any of the embodiments of swivel joints described herein or into any other swivel joint formed from first and second pipe sections.

Changes may be made in the construction, operation and arrangement of the various parts, elements, steps and procedures described herein without departing from the spirit and scope of the invention as described in the following claims.

The invention claimed is:

1. A swivel joint, comprising:
   a tubular first connector having a hollow end within which an internal face is formed and a first longitudinal axis;
   a tubular second connector having an end upon which an external face is formed and a second longitudinal axis, the end of the second connector received within the end of the first connector such that the first and second axes coincide, such that the connectors are relatively rotatable about the coincident axes, and such that the faces engage at an interface extending within a plane normal to the axes;
   an internal bore extending through each of the joined first and second connectors;
   an annular recess formed within the internal bore and extending longitudinally on each side of the interface;
   a first zone of hardened wear material situated within the recess at a position upstream from the interface; and
   a second zone of hardened wear material situated within the recess at a position downstream from the interface;
   in which the hardened wear material within a selected one of the first or second zones is press-fit within the recess such that at least a portion of the hardened wear material directly engages a wall or walls defining the recess.

2. The swivel joint of claim 1, further comprising:
   a first seal interposed between one of the connectors and one of the zones of wear material.

3. The swivel joint of claim 2, further comprising:
   a second seal interposed between one of the connectors and one of the zones of wear material.

4. The swivel joint of claim 1, in which the first zone of hardened wear material is made of stainless steel.

5. The swivel joint of claim 1, in which the second zone of hardened wear material is made of stainless steel.

6. The swivel joint of claim 1, in which the recess has a rectangular cross-sectional shape.

7. The swivel joint of claim 1, in which the first zone of hardened wear material comprises a first wear ring.

8. The swivel joint of claim 7, in which the second zone of hardened wear material comprises a second wear ring that is a separate piece from the first wear ring.

9. The swivel joint of claim 8, in which the first wear ring abuts the second wear ring.

10. The swivel joint of claim 1, further comprising:
    a seal positioned within an annular groove that is formed in an inner surface of the first connector, in which the annular groove is situated in a spaced relationship to the interface.

11. The swivel joint of claim 1, further comprising:
    a seal positioned within an annular groove that is formed in an outer surface of the second connector, in which the annular groove is situated in an axially spaced relationship to the interface.

12. The swivel joint of claim 1, in which a seal does not contact the internal face of the first connector and does not contact the external face of the second connector.

13. The swivel joint of claim 1, in which the first and second zones of hardened wear material form a boundary of the internal bore.

14. The swivel joint of claim 1, in which the first and second zones of hardened wear material are formed as separate pieces.

15. The swivel joint of claim 1, in which the first and second zones of hardened wear material are in communication with the internal bore.

16. The swivel joint of claim 1, in which the internal face of the first connector contacts the external face of the second connector.

17. The swivel joint of claim 1, in which no objects are interposed between the internal face of the first connector and the external face of the second connector at the interface.

18. The swivel joint of claim 1, further comprising:
    a weep hole formed in the second connector, in which the weep hole interconnects an internal surface and an opposed external surface of the second connector and is in an axially spaced relationship to the interface.

19. The swivel joint of claim 1, further comprising:
    a plurality of bearings interposed between the first and second connectors.

20. A system, comprising:
    the swivel joint of claim 1; and
    a fluid having a pressure of at least 5,000 pounds per square inch within at least a portion of the swivel joint.

* * * * *

UNITED STATES PATENT AND TRADEMARK OFFICE
CERTIFICATE OF CORRECTION

PATENT NO. : 11,346,476 B2
APPLICATION NO. : 16/129171
DATED : May 31, 2022
INVENTOR(S) : Nowell et al.

Page 1 of 1

It is certified that error appears in the above-identified patent and that said Letters Patent is hereby corrected as shown below:

In the Specification

Column 3, Line 49, please delete "to" and substitute therefore "10".
Column 4, Line 23, please delete "to" and substitute therefore "10".
Column 4, Line 46, please delete "to" and substitute therefore "10".
Column 5, Line 60, please delete "11o" and substitute therefore "110".

Signed and Sealed this
Twenty-sixth Day of July, 2022

Katherine Kelly Vidal
*Director of the United States Patent and Trademark Office*